United States Patent
Pashalidis

(10) Patent No.: US 8,464,067 B2
(45) Date of Patent: Jun. 11, 2013

(54) METHOD FOR ENABLING LIMITATION OF SERVICE ACCESS

(75) Inventor: Andreas Pashalidis, Leimen (DE)

(73) Assignee: NEC Europe Ltd., Heidelberg (DE)

(*) Notice: Subject to any disclaimer, the term of this patent is extended or adjusted under 35 U.S.C. 154(b) by 146 days.

(21) Appl. No.: 13/063,110

(22) PCT Filed: May 11, 2009

(86) PCT No.: PCT/EP2009/003323
§ 371 (c)(1),
(2), (4) Date: Mar. 9, 2011

(87) PCT Pub. No.: WO2010/028705
PCT Pub. Date: Mar. 18, 2010

(65) Prior Publication Data
US 2011/0161658 A1    Jun. 30, 2011

(30) Foreign Application Priority Data
Sep. 10, 2008   (EP) .................................... 08015967

(51) Int. Cl.
*H04L 29/06*    (2006.01)
(52) U.S. Cl.
USPC ........................................... 713/182; 726/31
(58) Field of Classification Search
None
See application file for complete search history.

(56) References Cited

U.S. PATENT DOCUMENTS

| | | |
|---|---|---|
| 6,487,659 B1 | 11/2002 | Kigo et al. |
| 2007/0169181 A1* | 7/2007 | Roskind ............................ 726/5 |
| 2008/0235772 A1* | 9/2008 | Janzen .............................. 726/5 |
| 2008/0256594 A1* | 10/2008 | Satish et al. ...................... 726/1 |
| 2009/0183246 A1* | 7/2009 | Kokologiannakis ............. 726/7 |
| 2010/0058060 A1* | 3/2010 | Schneider .................... 713/171 |
| 2011/0131661 A1* | 6/2011 | Valls Fontanals et al. ...... 726/26 |

FOREIGN PATENT DOCUMENTS

| | | |
|---|---|---|
| GB | 2371957 A | 8/2002 |
| WO | 2005/008399 A2 | 1/2005 |
| WO | 2005/069295 A1 | 7/2005 |

OTHER PUBLICATIONS

International Search Report, dated Oct. 19, 2009, from corresponding PCT application.

* cited by examiner

*Primary Examiner* — Gilberto Barron, Jr.
*Assistant Examiner* — Jaron K Brunner
(74) *Attorney, Agent, or Firm* — Young & Thompson

(57) ABSTRACT

A method for enabling limitation of service access where a service provider offers at least one service and a user possesses multiple different digital identities that can be used to invoke or register with the service, wherein the user agrees on a secret with a third party entity, assigns counter values to different digital identities used to invoke or register with a service, and requests the service by applying an encryption algorithm on the secret and the counter value assigned to the digital identity employed for the service request, and the third party entity receives the first verification value, applies the encryption algorithm to reconstruct the employed counter value, and provides information on whether the reconstructed counter value exceeds a limit.

26 Claims, 4 Drawing Sheets

| U | SP | RA |
|---|---|---|

$p = H(S \| I_{SR})$
$v_1 = H(p \| k_{i,SR})$
$v_1 \longrightarrow$ $[I_{SR}], I_i, v_1 \longrightarrow$ finds S corresponding to $I_i$
$\bar{p} \stackrel{?}{=} H(S \| I_{SR})$
$v_1 \stackrel{?}{=} H(\bar{p} \| \lambda)$
for some $1 \leq \lambda \leq lim_{SR}$
$\longleftarrow$ success/failure aborts if failure
checks that $v_1 \notin V_{SR}$
adds $v_1$ to $V_{SR}$

Fig. 3

| U | SP | RA |
|---|---|---|

$p = H(S \| I_{SR})$
$v_1 = H(p \| k_{i,SR})$
$v_2 = H(p \| I_i \| v_1)$
$v_1, v_2 \longrightarrow$ $\quad\quad\quad [I_{SR}], I_i, v_1, v_2 \longrightarrow$ $\quad\quad\quad\quad\quad\quad\quad\quad\quad\quad$ finds S corresponding to $I_i$
$\quad\quad\quad\quad\quad\quad\quad\quad\quad\quad \bar{p} \stackrel{?}{=} H(S \| I_{SR})$
$\quad\quad\quad\quad\quad\quad\quad\quad\quad\quad v_1 \stackrel{?}{=} H(\bar{p} \| \lambda)$
$\quad\quad\quad\quad\quad\quad\quad\quad\quad\quad$ for some $1 \leq \lambda \leq \lim_{SR}$
$\quad\quad\quad\quad\quad\quad\quad\quad\quad\quad v_2 \stackrel{?}{=} H(\bar{p} \| I_i \| v_1)$
$\quad\quad\quad\quad\quad\quad\quad\quad\quad\quad \longleftarrow$ success/failure $\quad\quad\quad$ aborts if failure
$\quad\quad\quad$ checks that $v_1 \notin V_{SR}$
$\quad\quad\quad$ adds $v_1$ to $V_{SR}$

Fig. 4

METHOD FOR ENABLING LIMITATION OF SERVICE ACCESS

The present invention relates to a method for enabling limitation of service access.

BACKGROUND OF THE INVENTION

In today's communication networks many different kind of services are existent and employed by a steadily growing number of users. Typically, these services are offered by service providers with which users may register in order get access to requested services. In general, a user's registration with a service provider is an anonymous process in a certain sense, i.e. the registration is based on a user's digital identity, whereas the user's real identity remains unknown to the service provider.

For many applications in the digital world, such as for instance e-voting, e-cash, electronic coupons or trial browsing of content, it is a crucial task to impose a strict limit on the number of different digital identities with which a user may invoke or register with a service. For instance, in case of e-voting it is essential to reliably assure that each user can vote only once. In case of trial browsing of content providers typically want to make sure that a specific user is allowed to browse content such as movies or music freely only for a limited number of times, e.g. the service provider may allow the user to download two movies or ten songs. After the trial phase the service provider wants the user to pay for the service.

According to the state of art there are solutions for enabling a limitation of service access that are based on asymmetric cryptography. However, these methods known from prior art are rather disadvantageous as the employed asymmetric techniques require expensive computations and complex key management procedures resulting in a high computational overhead. Due to their computational complexity, these methods are not suitable for many applications.

Furthermore, imposing a limit on the number of different digital identities with which a user may invoke or register with a service typically requires the service provider to obtain certain information about a registered user. This links the user's digital identity employed for accessing the service provider at least to some extent to the user's real identity. Such link may be critical with respect to preserving a user's privacy.

SUMMARY OF THE INVENTION

It is therefore an object of the present invention to improve and further develop a method for enabling limitation of service access in such a way that a high reliability with respect to the enforcement of the limitation is ensured. Further, the privacy of "honest" users, i.e. users that do not try to exceed a maximum number of admissible service accesses, shall be preserved, thereby employing mechanisms that are readily to implement and that involve a reduced computational complexity.

In accordance with the invention the aforementioned object is accomplished by a method comprising the features of claim 1. According to this claim a method for enabling limitation of service access is disclosed, wherein a service provider offers at least one service and wherein a user possesses multiple different digital identities $I_i$ that can be used to invoke or register with the service. Access to the service requires an account at a third party entity, wherein the user registers his digital identities $I_i$ with the account and wherein the user agrees on a secret S with the third party entity. The method comprises the steps of assigning to the user's different digital identities $I_i$ counter values $k_{i,SR}$, the user requesting the service employing a specific digital identity $I_i$ and calculating a verification value—first verification value $v_1$—by applying an encryption algorithm H on the secret S and the counter value $k_{i,SR}$ assigned to the digital identity $I_i$ employed for the service request, said third party entity receiving the first verification value $v_1$, applying the encryption algorithm H to reconstruct the employed counter value $k_{i,SR}$ and providing information of whether the reconstructed counter value $k_{i,SR}$ exceeds a limit $\lim_{SR}$.

According to the invention it has first been recognized that, in the context of enabling limitation of service access, existing mechanisms using public-key primitives are rather complex and are thus not applicable in various scenarios. Furthermore, it has been recognized that due to the fact that asymmetric cryptography requires a very high computational overhead, in particular in the case where the allowable number of registrations is large, the existing mechanisms are not efficient.

It has further been recognized that, by involving a third party entity in a suitable way, it is possible to realize an efficient registration limit enforcement that is exclusively based on symmetric cryptography primitives. Relying on symmetric techniques only, results in very low computational overheads and relatively simple key management.

A further advantage of the present invention is that the method is usable in a diverse range of application domains in order to prevent an exceeding of the limit. According to the invention, the limit is enforced in a way that enables the anonymity of users to be revoked if this is necessary and at the same time respects the privacy of "honest" users, i.e. users that do not try to exceed the limit. In other words, the method according to the invention has the inherent ability to revoke users' anonymity.

In a specific embodiment the service has associated a unique service identifier $I_{SR}$ for identification of the service at the third party entity. Especially in case of service providers offering a multitude of services, a unique service identifier $I_{SR}$ may be employed for distinguishing each of the services. This is important as a service provider may want to apply different policies for its services, i.e. for instance the number of admissible accesses for a user may vary from service to service.

According to a preferred embodiment the service identifier $I_{SR}$ may be accompanied by further information that is uniquely associated with the service. To this end the service identifier $I_{SR}$ is preferably contained in a bit string. The bit string can then be extended by including more service related information, like e.g. the Uniform Resource Locator (URL) of the service, the limit $\lim_{SR}$ of the number of admissible accesses defined for the service, an identifier for the concrete service instance, a time stamp value (e.g. indicating the actuality of the service) and/or a public key certificate or certificate chain for the service provider and/or the service.

Advantageously, the third party entity is a registration authority. The registration authority can assist the service provider in enforcing the limit, and may also act as an anonymity revocation authority. The registration authority gets to know the mapping of user identities to users; therefore, the registration authority is trusted not to disclose this mapping unless required for anonymity revocation purposes. Insofar it proves to be beneficial if the registration authority is a trusted entity, for instance a governmental administration or at least an official authority.

According to a preferred embodiment, the third party entity may ensure that each individual user is allowed to create only a rather limited number of accounts. This may be achieved by requiring a user to produce a document that is somehow assigned to his person and that the user possesses in practice typically only in a limited number. Characteristic examples of such documents would be passports, driving licenses, or credit cards.

In a particularly preferred embodiment the third party entity ensures that each individual user cannot have more than a single account. With only a single account at the third party entity, strict control of the number of accesses of a user at the service provider is possible. Preventing the creation of multiple accounts per user may be achieved by requiring a user to show some unique biometric identification before creating the account at the third party entity.

Advantageously, the encryption algorithm H is a deterministic one-way function. The present invention does not impose the usage of any particular one-way function for H, as long as it is deterministic. That is, it is required that a=b=>H(a)=H(b). Examples of one-way functions that can be used with the invention are (seeded) pseudorandom number generators, symmetric encryption schemes, message authentication code (MAC) schemes, and hash functions. It is recommended to use a cryptographic hash function that has an output that is indistinguishable from the output of a random oracle.

According to a preferred embodiment, the secret agreed upon between the user and the third party entity at the time of creating the account at the third party entity may be generated randomly as a unique secret value. From the point of generating the secret, it serves as a secret that is known only to the user and the third party entity. While it may be derived from a password or pass phrase, it is preferably generated uniformly at random from a large space. In order to ensure a high reliability the secret should be of sufficient length. The recommended length for the secret is equal to the output length of the employed encryption algorithm H.

As regards an efficient encryption, it may be provided that the user, in the context of accessing a service, calculates a value p by applying the encryption algorithm H on the secret agreed upon with the third party entity and the unique identifier $I_{SR}$ of the requested service. This can be done by first generating a concatenation of the secret and the identifier and by then applying the encryption algorithm H on the concatenated value. Alternatively, the secret and the service identifier may be employed as two independent input parameters for the encryption algorithm H. However, in both cases the order of the parameters is of importance insofar that the order must be maintained by the respective other parties.

In a next step it may be provided that the user calculates the first verification value denoted $v_1$ by applying the encryption algorithm H on the previously calculated value p and the respective counter value $k_{i,SR}$. The respective counter value $k_{i,SR}$ is the counter value associated to the digital entity employed by the user when attempting to access the service SR. Again, the two values may be concatenated before applying H or they may be input as two independent parameters.

According to a preferred embodiment it may be provided that the verification value $v_1$ is forwarded to the service provider by the user U directly. The service provider can then further forward the verification value $v_1$ to the third party entity thereby triggering the reconstruction process of the respective counter value $k_{i,SR}$ as described in more detail below. In addition, the service provider may transmit the unique service identifier $I_{SR}$ to the third party entity so that the service can easily be identified. It is to be noted that forwarding of the values by the service provider will be the most prominent application scenario since typically the service provider will be interested in enforcing a limit on the service access. However, there are applications, like e-voting for example, in which another entity or another person or group of persons or even the public has an interest in limiting the service usage, for instance to ensure that no person has given more than one vote. Insofar it is also possible that the above mentioned values, in particular the first verification value $v_1$ are forwarded to the third party entity by an external entity.

At the third party entity, after having received the verification value $v_1$, the counter value $k_{i,SR}$ (assigned to the digital identity $I_i$ employed for the user's service request) may be reconstructed as follows: The third party entity calculates a value $\bar{p}$ by applying the encryption algorithm H on the secret S and the unique service identifier $I_{SR}$ in the same way as the user U did. However, the problem is that the third party entity, when solely receiving the verification value $v_1$ and, as the case may be, the service identifier $I_{SR}$, does not dispose of any information from which it could deduce the correct secret S of the user. Thus, it is recommended that the third party entity keeps a list $V_s$ in which the secrets $S_n$ of all users having an account at the third party entity are contained. The third party entity can then start its calculation by (a) choosing a first secret $S_1$ from the list $V_s$ and (b) applying the encryption algorithm H as described resulting in a value $\bar{p}_1$.

In a next step the third party entity attempts to reconstruct verification value $v_1$ by applying the encryption algorithm H on the value $\bar{p}_1$ and λ value λ in the same way as the user U has applied algorithm H on the values p and $k_{i,SR}$ before. λ denotes a value between 1 and the limit $\lim_{SR}$. The calculation may be started with λ=1 and the value of λ may be successively increased until the correct first verification value $v_1$ is found. If the third party entity fails to reproduce the correct first verification value $v_1$, another secret, e.g. $S_2$, will be taken from the list $V_S$, and the calculation will be repeated as described above. If the third party entity succeeds in reconstructing the correct first verification value $v_1$, this means that the user has employed an admissible digital identity and that he has not exceeded the maximum tolerable number of service accesses. On the other hand, a failure in reconstructing the correct first verification value $v_1$ means that the user has already completely exploited the granted number of accesses and that he is now going to exceed the limit $\lim_{SR}$.

According to a preferred embodiment, the service provider SP, in addition to the first verification value $v_1$, forwards the digital identity $I_i$ employed by the user to the third party entity. By this means a significant reduction of computational effort can be achieved on the part of the third party entity, as the correct secret can directly be derived due to the mapping between the digital identities registered at the third party entity for the user and the agreed secret. Consequently, the calculations for reconstructing the counter value $k_{i,SR}$ (assigned to the digital identity $I_i$ employed for the user's service request) must be performed for one specific secret only.

Advantageously, after having received the first verification value together with the digital identity $I_i$, the reconstruction of the counter value $k_{i,SR}$ at the third party entity may comprise the following steps: In a first step the secret S corresponding to the digital identity $I_i$ is searched. In a second step a value $\bar{p}$ is calculated by applying the encryption algorithm H on the secret S and the unique service identifier $I_{SR}$ in the same way as the user did. In a third step, the first verification value $v_1$ is calculated by applying the encryption algorithm H on the value $\bar{p}$ and λ, λ again being a value between 1 and the limit $\lim_{SR}$. The calculation may be started with λ=1, and the value of λ may be successively increased until either the correct first verification $v_1$ is found or until the limit $\lim_{SR}$ is reached.

According to a preferred embodiment, the third party entity provides a failure message in case no correct first verification value $v_1$ was found, and provides a success message in case the correct first verification value $v_1$ was found. Depending on the result of the reconstruction, the service provider can meet different decisions as what regards the handling of the user's service request. For instance, it may be provided that the service provider rejects the service request in case of receiving a failure message from the third party entity. On the other hand, in the case of receiving a success message from the third party entity it is preferable not to automatically grant the user access to the service. Advantageously, in this case a further check is performed at the service provider. To this end the service provider SP maintains a list $V_{SR}$ of verification values $v_1$, i.e. a list in which all first verification values $v_1$ received from the user are stored. When the service provider receives a success message from the third party entity, it may check whether the corresponding first verification value $v_1$ is already included in its list $V_{SR}$. If so, this can be interpreted as strong evidence that the user attempts to access the service more times than he is allowed, and the service provider may reject the request. If not, the service provider may grant the user access and may add the received first verification values $v_1$ to the list $V_{SR}$.

In case the service provider forwards the digital identity employed by the user to the third party entity, a second verification value $v_2$ may by introduced which is intended to further strengthen the user's privacy. More specifically, it may be provided that the user calculates the second verification value $v_2$ by applying the encryption algorithm H on the value p, the digital identity $I_i$ and the first verification value $v_1$. As already described above, the three values may be concatenated first and the encryption algorithm H may be applied on the concatenated value. Again, the second verification value $v_2$ may be forwarded to the service provider by the user U directly. The service provider may then provide the second verification value $v_2$ to the third party entity.

After having successfully reconstructed the counter value $k_{i,SR}$ (assigned to the digital identity $I_i$ employed for the user's service request) by finding the correct first verification value $v_1$, it may be provided that the third party entity starts applying said encryption algorithm H on said value $\bar{p}$, said digital identity $I_i$ and said first verification value $v_1$ in the same way the user U did, to reconstruct the second verification value $v_2$.

According to a preferred embodiment, the third party entity provides a success message, in case the correct second verification value $v_2$ could be reconstructed. On the other hand, in case the reconstructions failed, a failure message may be provided by the third entity. It is to be noted that a reconstruction failure for second verification value $v_2$ (with first verification value $v_1$ having been reconstructed correctly) means that the value $v_1$ and the value $v_2$ do not match up and that the service provider has manipulated his request at the third party entity. For instance, the service provider may have amalgamated a digital user identity $I_i$ received in one service request with a first verification value $v_1$ received with another service request in order to learn whether both service requests were originated by the same user. By checking value $v_2$ in addition to value $v_1$ at the third party entity, this kind of misuse, which may be inadmissible in certain applications, can be noticed and can be disabled by providing a failure message to the service provider.

According to a preferred embodiment, the third party entity is online during the protocol. As a consequence, it is possible to really prevent users from exceeding the limit; some of the existing systems merely detect that a user has exceeded the limit after the fact, i.e. after service provisioning. However, there may be applications that do not require that the third party entity is online all the time; in some settings it may suffice if the third party entity is periodically online. In particular, sometimes it may not be necessary for a service provider to prevent a user from exceeding the limit; it may instead suffice to "clean" the database from duplicate accounts (or, more generally, accounts that exceeded the limit) in periodic intervals; in this case, the service provider can keep the first and second verification values $v_1$, $v_2$, it receives from the users, and validate their accounts with the help of the third party entity in periodic intervals.

According to a preferred embodiment, the limit $\lim_{SR}$ is predefined either by the service provider SP itself or by any external instance. For instance, in case of e-voting applications the limit $\lim_{SR}$ may be advantageously specified by a trusted authority. According to a further preferred embodiment the limit $\lim_{SR}$ may be dynamically changed, for instance depending on service parameters.

BRIEF DESCRIPTION OF THE DRAWINGS

There are several ways how to design and further develop the teaching of the present invention in an advantageous way. To this end, it is to be referred to the patent claims subordinate to patent claim 1 on the one hand and to the following explanation of preferred examples of embodiments of the invention, illustrated by the drawing on the other hand. In connection with the explanation of preferred embodiments of the invention by the aid of the drawing, generally preferred embodiments and further developments of the teaching will be explained. In the drawings FIG. 3 illustrates a second embodiment of the algorithm used for implementation of the registration limit enforcement protocol according to an embodiment of the present invention, FIG. 4 illustrates a third embodiment of the algorithm used for implementation of the registration limit enforcement protocol according to an embodiment of the present invention.

DETAILED DESCRIPTION OF THE PREFERRED EMBODIMENTS

Figure 1:
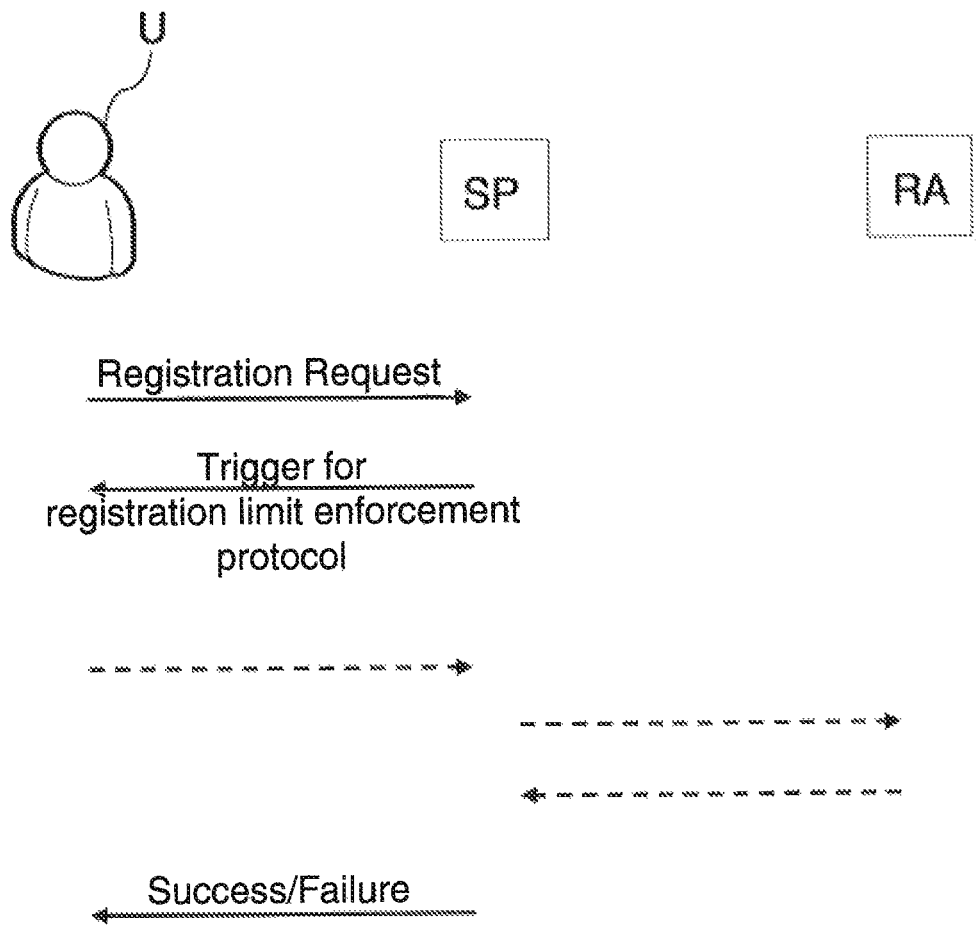
FIG. 1 is a schematic view of an implementation of a method for enabling limitation of service access according to an embodiment of the present invention.

FIG. 1 illustrates—schematically—the basic principles of a method according to the present invention for enabling limitation of service access. FIG. 1 is related to a scenario in which a service provider SP offers a service SR (among further services, as the case may be) and wherein a user U attempts to register with the service SR in order to use the service SR. The user U possesses multiple digital identities $I_i$ that can be used to invoke or register with the service SR.

For accessing the service SR, the user U is required to have an account at a third party entity, which in the specific example discussed is referred to as registration authority RA. The user U registers his digital identities $I_i$ with the account at the registration authority RA and agrees on a secret S with the RA. In FIG. 1, creating the user's U account with the registration authority RA is not shown, rather it is supposed that the account has already been created in the run-up to the user's U first registration request with the service provider SP.

The registration authority RA ensures that the user U can have only one single account or that the user U possesses at least only a very restricted number of accounts. The allowance of only one single account may be realized by requiring the user U to show some unique biometric identifier when creating the account at the registration authority RA.

After the user's U registration request, the service provider SP starts performing a method for enabling limitation of service access according to the present invention. More specifically, the service provider SP triggers a protocol with the user U that in the following is referred to as "registration limit enforcement protocol" and that will be described in more detail in connection with FIGS. 2, 3 and 4. In FIG. 1 the registration limit enforcement protocol is indicated with dotted lines. Basically, in the specific embodiment discussed the protocol involves the user U sending a message to the service provider SP, and the service provider SP engaging in a single message exchange with the registration authority RA.

Finally, depending on the outcome of the protocol the service provider SP can grant the user U access to the requested service (success), or the service provider SP can deny access (failure). The service provider SP will deny access if it turns out that the user has already been granted access for an admissible maximum number of times (which may be specified based on the service provider's SP policies).

Figure 2:
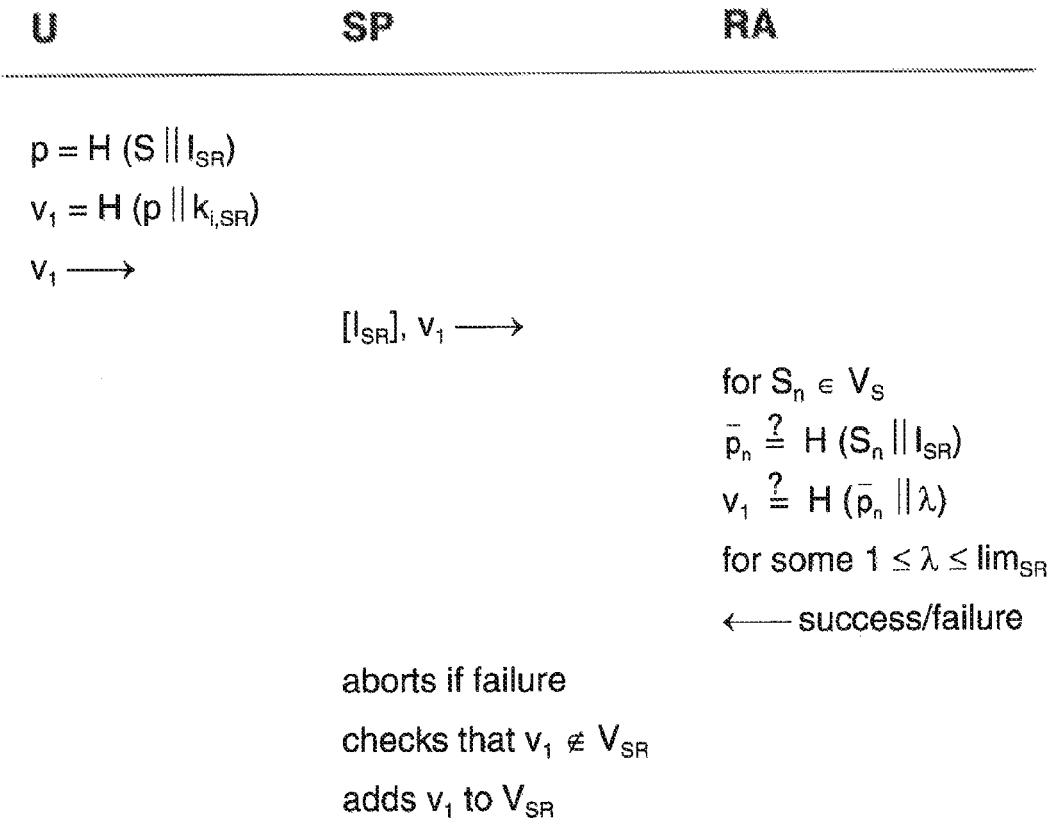
FIG. 2 illustrates a first embodiment of the algorithm used for implementation of the registration limit enforcement protocol according to an embodiment of the present invention.

FIG. 2 illustrates a first embodiment of the registration limit enforcement protocol in some more detail. Again it is assumed that the user U possesses a number of n different digital identities, denoted $I_i$ (with i=1, . . . , n, with n∈N). Furthermore it is assumed that the service provider SP offers a service SR the user U wishes to register with, wherein the service provider SP imposes a limit $\lim_{SR}$ on the service SR regarding the number of different identities $I_i$ with which a user may invoke or register with the service SR. It is further assumed that the user U already has an account at the registration authority RA with a secret S, and that the user U has his digital identities $I_i$ registered with his RA account. Consequently, the registration authority RA will be enabled to map a user's U digital identity $I_i$ to the user's "real identity" or at least to the agreed secret S.

Before starting the protocol the user U has to assign a unique counter value to each different identity with which he attempts to register with the service SR. The counter values are denoted by $k_{i,SR}$. The user U must keep track of which identities he attempts to register with the service SR. For example, the user U may have the digital identities $\{I_1, I_2, I_3, I_4, I_5\}$. If the user U registers with the service SR first using $I_2$, then using $I_4$ and then using $I_1$, then the counter values $k_{i,SR}$ may take the values $k_{2,SR}=1$, $k_{4,SR}=2$ and $k_{1,SR}=3$. The user U (or more precisely the user's U device employed for accessing the service SR) is required to remember these counter values. That is, if the user U decides to register with (or invoke) the service SR again in the future, then he should use the same counter value in the protocol.

When the user U sends a registration request for the service SR to the service provider SP employing a specific digital identity $I_i$, it is recommended that the user U and the service provider SP mutually authenticate themselves before initializing the limit enforcement protocol. The authentication mechanism is preferably coupled to the unique service identifier $I_{SR}$ and the employed digital identity $I_i$. That is, it is recommended that the user U authenticates service identifier $I_{SR}$ and that the service provider SP authenticates the digital identity $I_i$.

Furthermore, it is recommended that the service provider SP and the registration authority RA mutually authenticate each other before exchanging the messages of the limit enforcement protocol. In particular, it is recommended, that the registration authority RA ensures that it indeed communicates with the service provider SP that is providing the service identified by the service identifier $I_{SR}$.

The limit enforcement protocol starts with the user calculating a value p by applying an encryption algorithm H on the secret S and the unique service identifier $I_{SR}$. To this end, secret S and identifier $I_{SR}$ are concatenated first and H is then applied on the concatenated result. In the specific example illustrated in FIG. 2, the encryption algorithm H is a hash function. Subsequently, the user U calculates a verification value $v_1$ by applying the encryption algorithm H on the value p and the counter value $k_{i,SR}$ assigned to the digital identity $I_i$ employed for the service request, again by concatenating both parameters first and by applying H on the concatenated result.

The user U forwards the verification value $v_1$ to the service provider SP, either together with the registration request or in a separate message, for instance after mutual authentication. The service provider SP in turn provides the verification value $v_1$—and optionally (as indicated by the squared brackets) the unique service identifier $I_{SR}$—to the registration authority RA. The unique identifier $I_{SR}$ is sent, for example, in cases in which the authentication of the service provider SP towards the registration authority RA does not make it clear which particular service SR the protocol execution is meant for.

After having received the verification value $v_1$, the reconstruction of the counter value $k_{i,SR}$ assigned to the digital identity $I_i$ employed for the user's U service request at the registration authority RA may comprise four steps:

1.) The registration authority RA chooses a secret $S_n$ from a list $V_S$ in which the secrets of all users having an account at the registration authority RA are stored.

2.) The registration authority RA calculates a value $\bar{p}_n$ by applying the encryption algorithm H on the chosen secret $S_n$ and the unique service identifier $I_{SR}$ in the same way as the user U did before. In this context it is assumed that the user U and the registration authority RA are aware of which specific algorithm H is to be applied and of how the algorithm is to be applied (i.e. how to input the parameters). For instance, it is possible that the user U is provided with the respective information when creating his account with the registration authority RA.

3.) The registration authority RA attempts to reconstruct the verification value $v_1$ by applying the encryption algorithm H on the value $\bar{p}_n$ and a value $\lambda$ in the same way as the user U did before, wherein $\lambda$ is a value between 1 and the limit $\lim_{SR}$ defined for the service SR. The registration authority RA starts calculation with $\lambda=1$ and successively increases the value of $\lambda$ until either the correct verification value $v_1$ is found or the limit $\lim_{SR}$ is reached.

4.) In case the registration authority RA fails to successfully reconstruct the verification value $v_1$, the steps of 1.) to 3.) are repeatedly carried out with further secrets $S_n$ taken from the list $V_S$.

After having terminated the reconstruction calculations, the registration authority RA provides a failure message in case no correct first verification value $v_1$ was found, and it provides a success message in case $v_1$ was found. Failing of reconstruction of the verification value $v_1$ means, that the user has employed an inadmissible digital identity $I_i$ whose associated counter value $k_{i,SR}$ exceeds the limit $\lim_{SR}$ specified for the service SR. Thus, upon receipt of the failure message, the service provider SP aborts the user's U registration and denies access.

The service provider SP maintains a list $V_{SR}$ of verification values $v_1$ that have already been used before for registration purposes. In case of receiving a success message from the registration authority RA, the service provider SP checks whether the verification value $v_1$ is already an element of the list $V_{SR}$. If the value $v_1$ is not yet contained in the list $V_{SR}$, the service provider SP will add the value $v_1$ to the list $V_{SR}$. On the other hand, if the verification value $v_1$ is already listed in $V_{SR}$, the service provider SP knows that the user U has already registered to the service SR with the corresponding digital identity before. Consequently, the service provider SP rejects the user's U registration request.

It is to be noted that it is possible to use the protocol described in connection with FIG. 2 as a mechanism for k-use anonymous credentials. In this regard the secret S may be derived at the registration authority RA in a quasi iterative way as described above. Alternatively, any other mechanism to retrieve the correct S may be employed.

FIG. 3 illustrates a second embodiment of the registration limit enforcement protocol. The protocol is quite similar to the protocol described in connection with the embodiment shown in FIG. 2. Same elements and same parameters are denoted with like numerals. The following description focuses on the differences with respect to the embodiment of FIG. 2.

According to the embodiment of FIG. 3, the service provider SP provides some more information to the registration authority RA. More specifically, in addition to the verification value $v_1$, the service provider SP forwards the digital identity $I_i$ employed by the user U in connection with his service request to the registration authority RA. By providing this supplemental information, the computational effort on the part of the registration authority RA is drastically reduced. Due to the mapping between the digital identities $I_i$ registered at the registration authority RA for the user and the agreed secret S, the registration authority RA can directly derive the correct secret S. In other words, the registration authority RA uses the digital identity $I_i$ as an index in order to find the secret S. Consequently, the calculations for reconstructing the counter value $k_{i,SR}$ (assigned to the digital identity $I_i$ employed for the user's service request) must be performed for one specific secret only. In detail, the registration authority RA performs the following steps:

1.) The registration authority RA looks up the secret S corresponding to the user's U digital identity $I_i$.

2.) The registration authority RA calculates a value $\bar{p}$ by applying the encryption algorithm H on the secret S and the unique service identifier $I_{SR}$ in the same way as the user U did before.

3.) The registration authority RA attempts to reconstruct the verification value $v_1$ by applying the encryption algorithm H on the value $\bar{p}$ and a value $\lambda$ in the same way as the user U did before, wherein $\lambda$ is a value between 1 and the limit $\lim_{SR}$ defined for the service SR. The registration authority RA starts calculation with $\lambda=1$ and successively increases the value of $\lambda$ until either the correct verification value $v_1$ is found or the limit $\lim_{SR}$ is reached.

The protocol according to FIG. 3 imposes a lack of security in that the calculations on the part of the registration authority RA are based on two parameters—verification value $v_1$ and digital identity $I_i$—that are received from the service provider without any surveillance. It might happen that the service provider SP attempts to misuse the protocol. For instance, the service provider SP may combine a digital user identity $I_i$ received in one service request with a verification value $v_1$ received in another service request in order to learn whether both service requests were originated by the same user. Such information threatens the user's U privacy.

FIG. 4 illustrates an embodiment of the protocol which is an enhancement of the protocol described in connection with FIG. 3 and which eliminates the above mentioned privacy threat. In this embodiment the user U calculates a second verification value $v_2$ by applying the encryption algorithm H on the value p, the digital identity $I_i$ and the first verification value $v_1$. Subsequently the user U forwards the second verification value $v_2$ together with the first verification value $v_1$ to the service provider SP. Subsequently the service provider SP provides the second verification value $v_2$ together with the first verification value $v_1$ and the digital identity $I_i$—and optionally the unique service identify $I_{SR}$—to the registration authority RA.

After having successfully reconstructed the first verification value $v_1$ (corresponding to a determination of the validity of the respective counter value $k_{i,SR}$) at the registration authority RA, the second verification value $v_2$ is calculated by applying the encryption algorithm H on the reconstructed value p, the received digital identity $I_i$ and the received first verification value $v_1$ in the same way as the user U did before. By checking value $v_2$ in addition to value $v_1$ at the registration authority RA, the above mentioned misuse of the protocol by the service provider SP becomes apparent. By providing a failure message to the service provider SP in case no correct second verification value $v_2$ was found, the registration authority RA can disable the service provider's SP abuse. However, in case the correct second verification value $v_2$ was found, i.e. the first verification value $v_1$ and the digital identity $I_i$ match up, the registration authority RA provides a success message.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for enabling limitation of service access, wherein a service provider (SP) offers at least one service (SR) and wherein a user (U) possesses multiple different digital identities $I_i$ that can be used to invoke or register with said service (SR), access to said service (SR) requiring an account at a third party entity, wherein the user (U) registers his digital identities $I_i$ with said account and wherein the user (U) agrees on a secret S with said third party entity, the method comprising the steps of:
assigning to the user's (U) different digital identities $I_i$ counter values $k_{i,SR}$;
the user (U) requesting said service (SR) employing a specific digital identity $I_i$ and calculating a verification value—first verification value $v_1$—by applying an encryption algorithm H on said secret S and said counter value $k_{i,SR}$ assigned to the digital identity $I_i$ employed for said service request; and
said third party entity receiving said first verification value $v_1$, applying said encryption algorithm H to reconstruct said employed counter value $k_{i,SR}$ and providing information of whether the reconstructed counter value $k_{i,SR}$ exceeds a limit $\lim_{SR}$,
wherein said user (U), in the context of accessing said service (SR), calculates a value p by applying encryption algorithm H on said secret S and said service identifier $I_{SR}$, and wherein said user (U) calculates said first verification value $v_1$ by applying encryption algorithm H on said value p and said counter value $k_{i,SR}$.

2. The method according to claim 1, wherein said service (SR) has associated a unique service identifier $I_{SR}$ for identification of said service (SR) at said third party entity.

3. The method according to claim 2, wherein said service identifier $I_{SR}$ is contained in a bit string that additionally includes the URL (Uniform Resource Locator) of said service (SR) and/or said limit $\lim_{SR}$ and/or an identifier for the concrete service instance and/or a timestamp value and/or a public key certificate or certificate chain for said service provider (SP) and/or said service (SR).

4. The method according to claim 1, wherein said third party entity is a registration authority (RA).

5. The method according to claim 1, wherein said third party entity limits a number of accounts that said user (U) is permitted to possess at said third party entity.

6. The method according to claim 1, wherein said third party entity ensures that said user (U) cannot have more than one account, preferably by requiring said user (U) to show some unique biometric identification before creating said account at said third party entity.

7. The method according to claim 1, wherein said encryption algorithm H is a deterministic one-way function.

8. The method according to claim 1, wherein said encryption algorithm H is a hash function.

9. The method according to claim 1, wherein said secret S is generated randomly.

10. The method according to claim 1, wherein said user (U) forwards said first verification value $v_1$ to said service provider (SP).

11. The method according to claim 1, wherein said service provider (SP) provides said first verification value $v_1$, preferably together with said service identifier $I_{SR}$, to said third party entity.

12. The method according to claim 1, wherein said third party entity, upon receipt of said verification value $v_1$, starts reconstructing counter value $k_{i,SR}$ assigned to the digital identity $I_i$ said user (U) has employed for said service request, by performing the steps of:
  choosing a secret $S_n$ from a list $V_S$ of secrets assigned by said third party entity,
  calculating a value $\bar{p}_n$ by applying said encryption algorithm H on said chosen secret $S_n$ and said service identifier $I_{SR}$ in the same way said user (U) did,
  choosing a whole number λ between 1 and said limit $\lim_{SR}$, applying said encryption algorithm H on said value $\bar{p}_n$ and said λ in the same way said user (U) did, and
  varying successively said chosen number λ and said chosen secret $S_n$ until the result corresponds with the received first verification value $v_1$.

13. The method according to claim 1, wherein said service provider (SP) provides said digital identity $I_i$ to said third party entity.

14. The method according to claim 1, wherein said third party entity, upon receipt of both said verification value $v_1$ and said digital identity $I_i$, starts reconstructing counter value $k_{i,SR}$ assigned to the digital identity $I_i$ said user (U) has employed for said service request, by performing the steps of:
  searching said secret S corresponding to said digital identity $I_i$,
  calculating a value $\bar{p}$ by applying said encryption algorithm H on said secret S and said service identifier $I_{SR}$ in the same way said user (U) did,
  choosing a whole number λ between 1 and said limit $\lim_{SR}$, applying said encryption algorithm H on said value $\bar{p}$ and said λ in the same way said user (U) did, and
  varying successively said chosen number λ until the result corresponds with the received first verification value $v_1$.

15. The method according to claim 1, wherein said third party entity provides a failure message in case no correct first verification value $v_1$ was found, and provides a success message in case the correct first verification value $v_1$ was found.

16. The method according to claim 15, wherein said service provider (SP) aborts registration of said user (U) with said service (SR) in case of a failure message.

17. The method according to claim 1, wherein said third party entity is online periodically.

18. The method according to claim 1, wherein said limit $\lim_{SR}$ is predefined either by the service provider (SP) itself or by any external instance.

19. The method according to claim 1, wherein said limit $\lim_{SR}$ is dynamically changeable.

20. A method for enabling limitation of service access, wherein a service provider (SP) offers at least one service (SR) and wherein a user (U) possesses multiple different digital identities $I_i$ that can be used to invoke or register with said service (SR), access to said service (SR) requiring an account at a third party entity, wherein the user (U) registers his digital identities $I_i$ with said account and wherein the user (U) agrees on a secret S with said third party entity,
  the method comprising the steps of:
  assigning to the user's (U) different digital identities $I_i$ counter values $k_{i,SR}$;
  the user (U) requesting said service (SR) employing a specific digital identity $I_i$ and calculating a verification value—first verification value $v_1$—by applying an encryption algorithm H on said secret S and said counter value $k_{i,SR}$ assigned to the digital identity $I_i$ employed for said service request; and
  said third party entity receiving said first verification value $v_1$, applying said encryption algorithm H to reconstruct said employed counter value $k_{i,SR}$ and providing information of whether the reconstructed counter value $k_{i,SR}$ exceeds a limit $\lim_{SR}$,
  wherein said service provider (SP) maintains a list $V_{SR}$, in which first verification values $v_1$ received from said user (U) are included.

21. The method according to claim 20, wherein said service provider (SP) aborts registration of said user (U) with said service (SR) in case a check reveals that said successfully reconstructed first verification value $v_1$ is already an element of said list $V_{SR}$.

22. A method for enabling limitation of service access, wherein a service provider (SP) offers at least one service (SR) and wherein a user (U) possesses multiple different digital identities $I_i$ that can be used to invoke or register with said service (SR), access to said service (SR) requiring an account at a third party entity, wherein the user (U) registers his digital identities $I_i$ with said account and wherein the user (U) agrees on a secret S with said third party entity,
  the method comprising the steps of:
  assigning to the user's (U) different digital identities $I_i$ counter values $k_{i,SR}$;
  the user (U) requesting said service (SR) employing a specific digital identity $I_i$ and calculating a verification value—first verification value $v_1$—by applying an encryption algorithm H on said secret S and said counter value $k_{i,SR}$ assigned to the digital identity $I_i$ employed for said service request; and said third party entity receiving said first verification value $v_1$, applying said encryption algorithm H to reconstruct said employed counter value $k_{i,SR}$ and providing information of whether the reconstructed counter value $k_{i,SR}$ exceeds a limit $\lim_{SR}$, wherein said user (U), in the context of accessing said service (SR), calculates a value p by applying encryption algorithm H on said secret S and said service identifier $I_{SR}$, and wherein said user (U) calculates a further verification value—second verification value $v_2$—by applying said encryption algorithm H on said value p, said employed digital identity $I_i$ and said first verification value $v_1$.

23. The method according to claim 22, wherein said user (U) forwards said second verification value $v_2$ to said service provider (SP).

24. The method according to claim 22, wherein said service provider (SP) provides said second verification value $v_2$ to said third party entity.

25. The method according to claim 22, wherein said third party entity, after having successfully reconstructed said counter value $k_{i,SR}$ by finding the correct first verification value $v_1$, starts applying said encryption algorithm H on said value $\bar{p}$, said digital identity $I_i$ and said first verification value $v_1$ in the same way said user (U) did, to reconstruct said second verification value $v_2$.

26. The method according to claim 25, wherein said third party entity provides a success message in case the correct second verification value $v_2$ was found, and provides a failure message in case no correct second verification value $v_2$ was found.

* * * * *